(12) United States Patent
Li et al.

(10) Patent No.: US 8,940,337 B2
(45) Date of Patent: Jan. 27, 2015

(54) TRANSPARENT BACTERIAL CELLULOSE NANOCOMPOSITE HYDROGELS

(75) Inventors: Xinsheng Li, London (CA); Wankei Wan, London (CA); Chandrakant J. Panchal, Dollard-des-Ormeaux (CA)

(73) Assignee: Axcelon Biopolymers Corporation, London, ON (CA)

( * ) Notice: Subject to any disclaimer, the term of this patent is extended or adjusted under 35 U.S.C. 154(b) by 90 days.

(21) Appl. No.: 13/520,076

(22) PCT Filed: Dec. 23, 2010

(86) PCT No.: PCT/CA2010/002040
§ 371 (c)(1), (2), (4) Date: Sep. 26, 2012

(87) PCT Pub. No.: WO2011/079380
PCT Pub. Date: Jul. 7, 2011

(65) Prior Publication Data
US 2013/0011385 A1 Jan. 10, 2013

Related U.S. Application Data

(60) Provisional application No. 61/291,047, filed on Dec. 30, 2009.

(51) Int. Cl.
*A61K 9/50* (2006.01)
*C08J 3/24* (2006.01)
(Continued)

(52) U.S. Cl.
CPC ... *C08J 3/24* (2013.01); *C08F 2/00* (2013.01); *C08F 2/44* (2013.01); *C08J 3/075* (2013.01);
(Continued)

(58) Field of Classification Search
CPC .... A61K 9/0092; A61K 9/0024; A61L 27/54; A61L 31/16
See application file for complete search history.

(56) References Cited

U.S. PATENT DOCUMENTS 4,451,624 A 5/1984 Howes et al.
4,478,770 A 10/1984 Vofsi et al.
(Continued)

FOREIGN PATENT DOCUMENTS

| CA | 2654754 | 8/2010 |
|---|---|---|
| RU | 2298022 | 4/2007 |

OTHER PUBLICATIONS

Zhou et al, "Effect of Nanocellulose Isolation Techniques on the Formation of Reinforced Poly(vinyl alcohol) Nanocomposite Films", eXPRESS Polymer Letter vol. 6, No. 10 (2012), 794-804.*

*Primary Examiner* — Carlos Azpuru
(74) *Attorney, Agent, or Firm* — Hill & Schumacher; Lynn C. Schumacher; Stephen W. Leonard

(57) ABSTRACT

A transparent polymeric nanocomposite hydrogel is provided, wherein the polymeric nanocomposite hydrogel is made from a water insoluble polymer, i.e. poly(2-hydroxyethyl methacrylate) (PHEMA) or/and crosslinked PHEMA and a water insoluble nanofiber, i.e., bacterial cellulose (BC). Disclosed is a synthetic route for polymeric nanocomposites hydrogels. The preferred polymeric nanocompositions are produced through free radical polymerization of HEMA monomer in the presence of bacterial cellulose with an assistance of ultrasound to enhance the mixing of bacterial cellulose, initiator, and the monomers. The polymeric nanocomposite hydrogel is then formed by immersion of the dry polymeric nanocomposite in water. Disclosed is a high transmittance polymer nanocomposite hydrogel with a preferred BC loading less than 0.1%, water content of about 40% in weight, good mechanical integrity and strength. The disclosed polymer nanocomposite hydrogel and compositions pertain to hydrogel applications, particularly contact lenses and optic components for biosensor.

11 Claims, 11 Drawing Sheets

(51) Int. Cl.
*C08F 2/00* (2006.01)
*C08F 2/44* (2006.01)
*C08J 3/075* (2006.01)
*C08L 1/02* (2006.01)
*C08L 33/06* (2006.01)

(52) U.S. Cl.
CPC .............. C08L 1/02 (2013.01); C08L 33/066 (2013.01); *C08J 2333/04* (2013.01); *Y10S 977/773* (2013.01); *Y10S 977/906* (2013.01)
USPC ........................... 424/501; 977/773; 977/906

(56) References Cited

U.S. PATENT DOCUMENTS

| | | |
|---|---|---|
| 5,155,194 A | 10/1992 | Kossmehl et al. |
| 5,207,826 A | 5/1993 | Westland et al. |
| 5,214,452 A | 5/1993 | Kossmehl et al. |
| 5,290,830 A | 3/1994 | Tung et al. |
| 5,484,863 A | 1/1996 | Molock et al. |
| 5,498,407 A | 3/1996 | Atlas |
| 5,617,154 A | 4/1997 | Hoffman |
| 5,629,055 A | 5/1997 | Revol et al. |
| 5,955,326 A | 9/1999 | Bungay, III et al. |
| 5,962,676 A | 10/1999 | Tammarate et al. |
| 6,103,790 A | 8/2000 | Cavaille et al. |
| 6,294,614 B1 | 9/2001 | Kataoka et al. |
| 6,478,423 B1 | 11/2002 | Turner et al. |
| 6,500,777 B1 | 12/2002 | Wiseman et al. |
| 6,838,508 B2 | 1/2005 | Hsiao et al. |
| 7,045,366 B2 | 5/2006 | Huang et al. |
| 7,070,640 B2 | 7/2006 | Chung et al. |
| 7,071,274 B2 | 7/2006 | Fujisawa et al. |
| 7,074,301 B2 | 7/2006 | Hamed et al. |
| 7,074,918 B2 | 7/2006 | Medoff et al. |
| 7,084,188 B2 | 8/2006 | Lai et al. |
| 7,091,049 B2 | 8/2006 | Boga et al. |
| 7,097,301 B2 | 8/2006 | Legerton et al. |
| 7,098,282 B2 | 8/2006 | Novicky |
| 7,104,648 B2 | 9/2006 | Dahi et al. |
| 7,147,325 B2 | 12/2006 | Gotou et al. |
| 7,201,481 B2 | 4/2007 | Rosenzweig et al. |
| 7,247,270 B2 | 7/2007 | Hu et al. |
| 7,249,849 B2 | 7/2007 | Marmo et al. |
| 7,279,507 B2 | 10/2007 | Hu et al. |
| 2005/0037082 A1* | 2/2005 | Wan et al. ................... 424/488 |
| 2008/0064072 A1 | 3/2008 | Wan et al. |
| 2009/0028927 A1 | 1/2009 | Wan et al. |
| 2009/0252800 A1 | 10/2009 | Wan et al. |

* cited by examiner (a)

(b)

(c)

a)

b)

c)

d)

e)

TRANSPARENT BACTERIAL CELLULOSE NANOCOMPOSITE HYDROGELS

CROSS-REFERENCE TO RELATED APPLICATION

This application is a National Phase application claiming the benefit of PCT/CA2010/002040 filed on Dec. 23, 2010, in English, which further claims priority to U.S. Provisional Application No. 61/291,047, titled "TRANSPARENT BACTERIAL CELLULOSE NANOCOMPOSITE HYDROGELS" and filed on Dec. 30, 2009, the entire contents of which are incorporated herein by reference.

FIELD OF THE INVENTION

This invention relates to hydrogels and methods of making the same. More particularly, the invention relates to transparent hydrogels with improved mechanical properties and water content.

BACKGROUND OF THE INVENTION

Numerous hydrogel compositions and their biomedical applications are known in the art in the form of films formed from those compositions. U.S. Pat. No. 5,567,435 to Hubbell et al. (1996) disclosed a biodegradable hydrogel used as tissue contacting materials and controlled-release carriers. U.S. Pat. No. 7,091,299, to Salamone et al. (2006) disclosed an optically transparent hydrogel as used in ophthalmic devices such as intraocular lenses, contact lenses and corneal inlays. The polymer compositions were produced through the polymerization of one or more siloxysilane monomers or the copolymerization of one or more siloxysilane monomers with one or more aromatic or non-aromatic non-siloxy monomers, hydrophobic monomers or hydrophilic monomers.

U.S. Pat. No. 7,071,274, to Fujisawa et al. (2006) disclosed a silicon hydrogel having high oxygen permeability and transparency and being suitable to an ophthalmic lens, ocular lens and contact lens. U.S. Pat. No. 7,091,283, to Muller et al. (2006) disclosed a hydrophilic hydrogel used for biomedical moldings, for example ophthalmic moldings such as contact lenses. The hydrophilic hydrogels are made from crosslinkable copolymers, which are obtainable by (a) copolymerizing at least one hydrophilic monomer having one ethylenically unsaturated double bond and at least one crosslinker comprising two or more ethylenically unsaturated double bonds in the presence of a chain transfer agent having a functional group; and (b) reacting one or more functional groups of the resulting copolymer with an organic compound having an ethylenically unsaturated group. Recently, U.S. Pat. Nos. 7,279,507 and 7,247,270, to Hu et al. (2007), U.S. Pat. No. 7,249,849 to Marmo et al. (2007), U.S. Pat. No. 7,201,481 to Rosenzweig et al. (2007), U.S. Pat. No. 7,084,188 to Lai et al. (2006), and U.S. Pat. No. 7,147,325 to Gotou et al. (2006) described applications of hydrogel in soft contact lenses, technical problems remaining in wearing contact lenses, and solutions for them using hydrogel technology.

U.S. Pat. No. 7,091,049, to Boga et al. (2006) described a biosensor having a metalized film upon which was printed (contact printed) a specific predetermined pattern of an analyte-specific receptor. U.S. Pat. No. 7,105,588 to Yang et al. (2006), described a screen printable hydrogel for medical applications. The screen printable hydrogel composition comprises (a) soluble or partially soluble polymer wherein the polymer is a copolymer, interpolymer or mixture thereof; (b) initiation system; (c) thickener; (d) water; and (e) solvent; with the proviso that the composition has a viscosity of greater than about 10 Pa·s. U.S. Pat. No. 7,045,366 to Huang et al. (2006), disclosed a photo-crosslinked hydrogel blend surface coatings, where the hydrogel provides an improved approach using blend to achieve high quality, uniform coatings with better commercial viability than other approaches including copolymerization. Dextran and acrylamide systems are preferred. Benzophenone groups can be used as photocrosslinking groups. Applications of such hydrogel coating include mass spectral analysis of biomolecular analytes such as proteins.

One of the most widely applied polymer to form hydrogels, especially in medical applications, is poly(hydroxyethyl methacrylate), i.e., PHEMA. It is well known that PHEMA is a biocompatible polymer and is biologically inert, and can be easily prepared through free radical polymerization with or without solvent by photo and thermal initiations. In most practical applications, PHEMA is synthesized in the presence of a small quantity of crosslinker to form a crosslinked PHEMA. The degree of crosslinking can be adjusted according to the application requirements of hardness and mechanical strength.

PHEMA swells in water to form a hydrogel. Various parameters such as temperature, pH, and concentrations of ionic species in the solution determine the swelling behavior of PHEMA. This behavior has been explored for biosensor applications. In particular, the crosslinked PHEMA is transparent in its hydrogel form, which has led to the commercial success of PHEMA-based soft contact lenses.

Due to its hydrophilicity, PHEMA hydrogel offers more comfortable wearing than its competitor materials such as silicon-based hydrogel contact lenses. PHEMA has also been found to be suitable materials for wound dressing, biosensors, artificial muscles, and artificial organs. U.S. Pat. No. 5,498,407, to Atlas (1996) described PHEMA fibers used in cosmetic compositions containing same. The cosmetic composition consists of PHEMA fibers or copolymer of PHEMA fibers wherein the monomer is selected from the group consisting of acrylic acid, methacrylic acid, crotonic acid, hydroxyethylmethacrylate, hydroxyethylacrylate, hydroxypropylacrylate, hydroxypropyl methacrylate, hydroxybutyl methacrylate, N-vinyl-2-pyrolidone, and neopentyl glycol dimethacrylate in a weight ratio of 0.5 to 15%.

In considering the feasibility of a biomaterial for biomedical applications, for example, PHEMA based hydrogels used as contact lenses, the important parameters to be taken into account include water content and mechanical properties, which are closely related to the wearing duration and comfort of soft contact lenses. Unfortunately, attempts to improve both mechanical properties and water swelling content have been problematic. The water content of a PHEMA based polymers may be increased by introducing monomers of higher hydrophilicity into the PHEMA backbone, but this leads to poor mechanical strength of biomaterial making the resulting products less durable. On the other hand, the mechanical properties along with thermal stability can be improved by adding a higher concentration of crosslinker. However, the formed biomaterial with high ratio of crosslinker to PHEMA will make the biomaterial more rigid and decrease water content significantly. Finding a suitable balance between the mechanical strength and the water content of PHEMA hydrogels is therefore very challenging, especially in developing PHEMA-based hydrogels for biological applications, for instance, as soft contact lenses.

It is therefore apparent from the above that there is a need for the development of a transparent hydrogel with improved light transmittance, high water content and good mechanical strength.

SUMMARY OF THE INVENTION

Embodiments disclosed herein provide a new family of nanocomposites hydrogels, which comprise nanosized cellulose and PHEMA. The incorporation of nanosized cellulose within a polymerized PHEMA material results in a polymer nanocomposite hydrogel composition with enhanced mechanical strength. Advantageously, and unlike known hydrogel compositions, the improved mechanical strength is obtained without sacrificing the quantity of swollen water, as desired in many biomedical applications. Furthermore, nanocomposite hydrogel compositions and their methods of production as disclosed herein provide transparent hydrogel materials, which are well-suited to applications involving compositions of contact lenses and optical biosensors.

In one embodiment, there is provided a method of producing a nanocomposite hydrogel including nanoscale biopolymer fibers, with nanometer sized diameters, dispersed in the polymerized matrix (preferably comprising PHEMA). The nanoscale biopolymer fibers are preferably nanoscale cellulose. More preferably, the nanoscale cellulose is bacterial cellulose that is synthesized under controlled conditions, with a diameter ranging from about 10-200 nm, and most preferably between 50-100 nm. The nanoscale cellulose fibers are dispersed or embedded into the polymer matrix by free radical polymerization of polymer monomer in the presence of nanoscale biopolymer fibers.

The nanocomposite hydrogel is preferably made via free radical polymerization of HEMA monomer in the presence of bacterial cellulose. A second monomer ethylene glycol dimethacrylate (EGDMA) acts as the crosslinking agent to enhance the interaction of PHEMA with the surface of bacterial cellulose and improve the network of the composites.

Accordingly, in a first aspect, there is provided a method of producing a transparent nanocomposite hydrogel, comprising the steps of: preparing a mixture comprising a transparent hydrogel forming monomer and nanosized cellulose fiber, the monomer provided in a liquid state; agitating the mixture under application of ultrasound to obtain a substantially homogeneous dispersion of the nanosized cellulose fiber within the mixture; initiating a polymerization of the mixture; incubating the mixture and forming a polymerized material; and contacting the polymerized material with an aqueous environment to form a hydrogel; wherein a concentration of the nanosized cellulose fiber is less than 0.1% by weight. Mechanical agitation may be provided while applying the ultrasound.

Contact of the polymerized material with the aqueous environment may be maintained for a time interval sufficiently to obtain a desired amount of water retention within the hydrogel.

The nanosized cellulose fiber is preferably bacterial cellulose, and more preferably is obtained from *Acetobacter xylinum*. The bacterial cellulose may comprise an average diameter within a range of about 10 to 200 nm.

The nanosized cellulose fiber may be added to the mixture in a suspension. The mixture may be heated to a temperature during the application of the ultrasound, wherein the temperature is below a temperature at which polymerization occurs.

The ultrasound may be applied in a heating bath with a controlled temperature below 65° C., and where the temperature is more preferably in a range of approximately 40-50° C.

The mixture may further comprise a one or more co-monomers. The one or more co-monomers may be selected from the group consisting of acrylate monomers of 2-hydroxyethylacrylate, polyethyleneglycol acrylates, polyethyleneglycol methacrylates, 4-hydroxybutylmethacrylate, glycerol mono methacrylate, glycerol mono acrylate, 2-sulfoethylmethacrylate, phenoxyethyl acrylate, phenoxy ethyl methacrylate, 2-(2-ethoxyethoxy)ethyl acrylate, 2-(2-ethoxyethoxy)ethyl methacrylate, furfuryl acrylate, furfuryl methacrylate, acrylamide monomers of N-ornithine acrylamide, N-(2-hydroxypropyl)acrylamide, N-phenylacrylamide, dimethylaminopropyl methacrylamide, benzylmethacrylamide, methylthioethylacrylamide, N-vinyl pyrolidone, acrylic acid, acrylate monomers of lauryl methacrylate, lauryl acrylate, 2-ethylhexyl acrylate, 2-ethylhexyl methacrylate, n-decyl acrylate, n-decyl methacrylate, hexyl acrylate, hexyl metcarylate, stearyl acrylate, stearyl methacrylate, isodecyl acrylate, isodecyl methacrylate, isobornyl acrylate, isobornyl methacrylate, 1-hexadecyl acrylate, 1-hexadecyl methacrylate, n-myristyl acrylate, n-myristyl methacryalte, n-butyl methacrylate, isooctyl acrylate, isotridecyl acrylate, isooctyl methacrylate, and isotridecyl methacrylate, vinyl monomers of vinyl laurate, vinyl stearate, n-dodecyl methacrylamide, and butyl acrylate.

The mixture may further comprise a crosslinker, wherein a ratio of the crosslinker to the monomer by weight is within a range of approximately 0.1 to 10%. The crosslinker may be selected from the group consisting of ethyleneglycol di(meth) acrylate, triethyleneglycol di(meth)acrylate, tetraethylene glycol di(meth)acrylate, trimethylopropane tri(meth)acrylate, bisphenol A di(meth)acrylate, ethoxylate bisphenol A di(meth)acrylate, pentaerythritol tri-, and tetra(meth)acrylate, tetramethylene di(meth)acrylate, methylenebisacrylamide, methacryloxyethyl vinyl carbonate, triallylcyanurate, methacryloxyethyl vinyl urea, divinyl benzene, diallyl itaconate, allyl methacrylate, diallyl phthalate, siloxanylbisalkyl(meth)acrylate, and ethylene glycol di(meth)acrylate. One or more of a water content and mechanical strength of the hydrogel may be controlled by selecting an effective concentration of the nanosized cellulose fiber and the crosslinker.

The monomer is preferably hydroxyethyl methacrylate, and the monomer may be polymerized by free-radical polymerization. The free-radical polymerization may be initiated by a thermal initiator, wherein a ratio of the initiator to the monomer by weight is within a range of approximately 0.2 to 5%. The thermal initiator may be selected from the group consisting of peroxides, azo compounds, carbonyl compounds, sulfur compounds, halogen compounds and metal salts. The monomer may comprise (meth)acryloyl groups, styryl groups, allyl groups, vinyl groups and other polymerizable carbon-carbon unsaturated bonds.

Preferably, the monomer is hydroxyethyl methacrylate and the mixture further comprises a crosslinker comprising ethylene glycol dimethacrylate, wherein a ratio of the crosslinker to the monomer by weight is within a range of approximately 0.1 to 10. The mixture may further comprise a thermal initiator comprising benzoyl-peroxide, wherein a ratio of the initiator to the monomer by weight is within a range of approximately 0.2 to 5%.

An environment comprising an inert gas may be provided while forming the polymerized material.

After the step of forming the polymerized material, the polymerized material may be immersed in the aqueous environment.

At least a portion of the mixture may be placed in a mould prior to the step of forming the polymerized material. The mould may be shaped to form a contact lens or a wound dressing material. The mould may act as a reactor with control conditions allowing processing the polymerization for the mixture.

A portion of the mixture may be coated onto a surface of a biomedical device prior to the step of forming the polymerized material. The biomedical device may be selected from the group consisting of contact lenses and biomedical implants.

The method may further comprise the step of adding a bioactive agent prior to the step of forming the polymerized material, where the bioactive agent may be selected from the group consisting of drugs, therapeutic molecules, proteins, peptides, nucleic acids including RNA and DNA, polysaccharides, antibodies and fragments thereof, and combinations thereof.

In another aspect, there is provided a transparent nanocomposite hydrogel comprising a hydrophilic polymer network having nanosized cellulose fiber dispersed therein, wherein a concentration of the nanosized cellulose is between 0.005% and 0.1% by weight.

The hydrogel preferably comprises a water content greater than approximately 0.4 g/g and the nanosized cellulose fiber is preferably bacterial cellulose, wherein the bacterial cellulose is preferably obtained from *Acetobacter xylinum*.

An average diameter of the bacterial cellulose is preferably within a range of about 10 to 200 nm.

The hydrogel may comprise poly(hydroxyethyl methacrylate) and may further comprises a concentration of ethylene glycol dimethacrylate.

A transparency of the hydrogel within at least a portion of the visible spectrum preferably exceeds approximately 80%, and more preferably exceeds approximately 90%.

The transparent may further comprise a concentration of a bioactive agent provided therein, where the bioactive agent may be selected from the group consisting of drugs, therapeutic molecules, proteins, peptides, nucleic acids including RNA and DNA, polysaccharides, antibodies and fragments thereof, and combinations thereof.

The nanocomposite hydrogel may exhibit retainable water capacity and content approximately equal to that of PHEMA, and may exhibit enhanced mechanical strength and thermal stability relative to those of PHEMA.

In another aspect, there is provided a contact lens and a wound dressing, comprising a transparent nanocomposite hydrogel according to the aforementioned composition.

In yet another aspect, there is provided a biosensor comprising surface coated with a transparent nanocomposite hydrogel according to the aforementioned composition.

In another aspect, there is provided a medical device comprising surface coated with a transparent nanocomposite hydrogel according to the aforementioned composition.

In another aspect, there is provided a transparent nanocomposite hydrogel formed according to the methods disclosed above.

Transparent polymer nanocomposite hydrogels, according to embodiments described herein, provide improved mechanical strength and water swelling properties. The polymeric nanocomposite hydrogels can be applied as a coating on contact lenses, or, can be directly cast in molds or onto the shape of contact lenses. Polymeric nanocomposite hydrogels can also be applied as compositions of biosensor for controlled drug release and other functions, which may be fabricated into a biomedical device. Furthermore, the polymeric nanocomposite hydrogels can be applied to other bio-applications including wound healing, and implantation.

A further understanding of the functional and advantageous aspects of the invention can be realized by reference to the following detailed description and drawings.

BRIEF DESCRIPTION OF THE DRAWINGS

The embodiments of the present invention are described with reference to the attached figures, wherein.

DETAILED DESCRIPTION OF THE INVENTION

Figure 1:
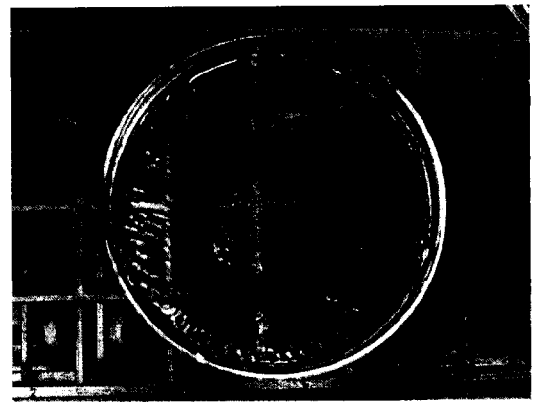
FIG. 1 provides photographs of samples of polymer nanocomposite bacterial cellulose (BC)-PHEMA hydrogels after immersion of dry BC-PHEMA samples in water for 10 days, showing (a) a PHEMA hydrogel, (b) a 0.05% BC-PHEMA hydrogel, and (c) a 0.1% BC-PHEMA hydrogel.
Figure 1:
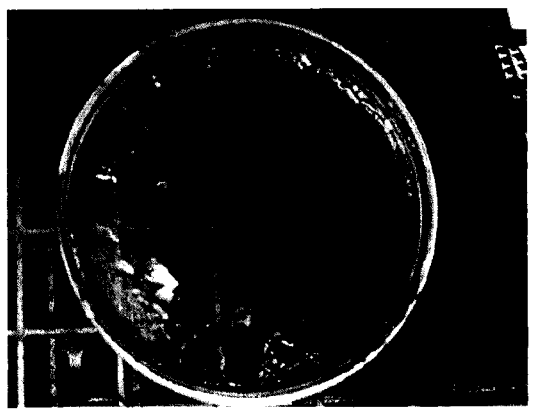
Figure 1:
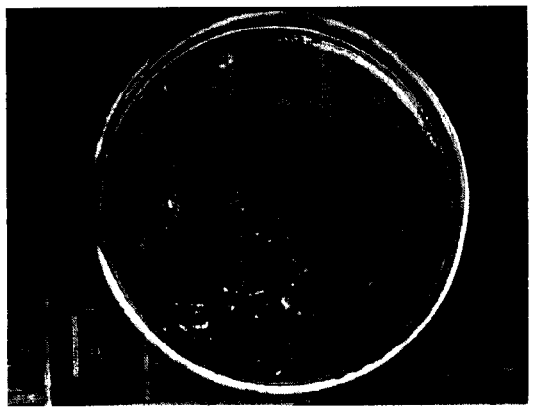

Generally speaking, the systems described herein are directed to transparent nanocomposite hydrogels formed with bacterial cellulose and a transparent hydrogel forming monomer, and methods of making the same. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to transparent nanocomposite hydrogels formed with bacterial cellulose and PHEMA, and methods of making the same.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the terms "about" and "approximately, when used in conjunction with ranges of dimensions of particles, compositions of mixtures or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

As used herein, the coordinating conjunction "and/or" is meant to be a selection between a logical disjunction and a logical conjunction of the adjacent words, phrases, or clauses. Specifically, the phrase "X and/or Y" is meant to be interpreted as "one or both of X and Y" wherein X and Y are any word, phrase, or clause.

As used herein, the term "hydrogel" is generally defined as a hydrophilic polymeric material or hydrophilic polymer networks with a three dimensional structure that swells in and retains water. Hydrogels are useful in many medical applications due to their hydrophilicity. Typical medical applications of hydrogels are contact lenses, tissue adhesives, drug delivery, wound dressings, biosensors, and artificial muscles, artificial organs, prosthetics and surface coatings used in biomedical devices and sensors.

Disclosed herein is a family of polymer nanocomposite hydrogels with high optical transparency in the visible spectrum and superior mechanical properties. The polymer nanocomposite is produced by polymerization of at least one monomer in the presence of nanoscale biopolymer fiber. The monomer is selected to be a monomer that is known to form a transparent material when polymerized, and the concentration of biopolymer fibers is selected to provide a composite material with sufficiently high optical transparency. The biopolymer fibers are preferably nanoscale cellulose comprising cellulose fibers with diameters on the nanometer scale. Unlike previous nanocomposite hydrogels, the embodiments disclosed herein provide a nanocomposite hydrogel that maintains high optical transparency after polymerizing the monomer in the presence of the biopolymer fibers.

The method of forming the nanocomposite hydrogel preferably involves a batch polymerization process, in which a mixture is first formed by contacting a monomer with a quantity of nanoscale biopolymer fibers. The monomer is preferably provided in a liquid state, and the nanoscale biopolymer may be provided dry or in a suspension form.

The mixture is then incubated under agitation and the agitation is preferably provided by ultrasonic mixing. The agitation is provided over a time interval sufficient to substantially disperse the nanoscale biopolymer fibers evenly throughout the mixture. This step is important for obtaining a nanocomposite hydrogel with high optical transparency and low optical scattering and/or absorption. In a preferred embodiment, the mixture is heated during this process to aid in the mixing, provided that the temperature is maintained below a polymerization initiation temperature.

Additional non-limiting agitation methods include mechanical agitation, for example, via magnetic stirring. In a preferred embodiment, mechanical mixing and ultrasonic mixing are both provided, where the mechanical mixing provides large-scale fluidic mixing and the ultrasonic mixing provides an acoustic vibratory field that prevents local clumping and adhesion of nanoscale fibers.

The nanostructure, transparency, and mechanical properties of polymer nanocomposites according to embodiments disclosed herein can be finely adjusted by controlling molecular weight, surface functional group and chain type.

The polymerization is commenced via a suitable polymerization initiation method. Non-limiting exemplary initiation methods, depend on the choice of polymerizable materials, include applications of radiation, including microwave, thermal, e-beam and/or ultraviolet. Preferred methods of initiating polymerization include applications of thermal and/or ultraviolet initiation. Useful initiators are those which can be used to generate free radicals to initiate polymerization of the monomer within an acceptable time period. Thermal initiators are preferably added to the monomer when forming the mixture prior to the aforementioned mixing step. An inert gas environment may be provided to protect the reaction from oxygen, while purging possible gas products from the reaction. In a preferred embodiment, the inert gas is nitrogen. Alternatively, other inert gases such as argon, helium, and carbon dioxide may be used.

For embodiments involving bulk polymerization, the polymerized dry nanocomposite material may then be contacted or immersed with an aqueous environment for the preparation of a hydrogel. Preferably, the polymerized nanocomposite material is contacted or immersed in the aqueous environment for a time interval sufficient to obtain a desired level of water retention.

The properties (for example, mechanical properties or water retention ability) may be further tailored by providing a crosslinking substance prior to initiating polymerization of the nanocomposite. The crosslinkers incorporating themselves into the resulting polymer network during the polymerization. Examples of crosslinkers include, but are not limited to, ethyleneglycol di(meth)acrylate, triethyleneglycol di(meth)acrylate, tetraethylene glycol di(meth)acrylate, trimethylopropane tri(meth)acrylate, bisphenol A di(meth)acrylate, ethoxylate bisphenol A di(meth)acrylate, pentaerythritol tri-, and tetra(meth)acrylate, tetramethylene di(meth)acrylate, methylenebisacrylamide, methacryloxyethyl vinyl carbonate, triallylcyanurate, methacryloxyethyl vinyl urea, divinyl benzene, diallyl itaconate, allyl methacrylate, diallyl phthalate, siloxanylbisalkyl(meth)acrylate, ethylene glycol di(meth)acrylate, and the like.

In a preferred embodiment, the nanoscale cellulose is bacterial cellulose. The polymer hydrogel network, formed from the polymerization of a transparent polymer forming monomer in the presence of bacterial cellulose, provides a material system that can be tailored to exhibit high mechanical strength and high water retention values. These features make the biosynthesized bacterial cellulose a preferred candidate relative to conventional nanosized inorganic or organic materials for developing the nanocomposite hydrogel targeted for biomedical applications.

Bacterial cellulose (BC) is a linear natural polymer fiber of glucose. It is insoluble in water and degradable by microbial and fungal enzymes. However, the degradation of cellulose in animal and human tissues is limited, which makes it ideal for implant applications. Bacterial cellulose in the form of nanosized fibrils is synthesized by the bacterium *Acetobacter xylinum*. The hydroxyl groups provide hydrogen bonds to hold the cellulose chains together. This accounts for its high water content and high degree of crystallinity. Preferably, the bacterial cellulose is produced in high purity and with defined dimensions under controlled conditions.

Bacterial cellulose is preferably synthesized under controlled conditions, with a diameter ranging from about 10-200 nm, and most preferably between 50-100 nm. For example, bacterial cellulose may be produced according to the methods disclosed in U.S. Pat. No. 5,846,213, titled "Cellulose Membrane and Method for Manufacture Thereof", which is incorporated herein by reference in its entirety. The nanoscale cellulose fibers are dispersed or embedded into the polymer matrix by free radical polymerization of monomer in the presence of the nanoscale cellulose fibers.

Bacterial cellulose can be synthesized in a state of high purity by fermentation. In the examples provided herein, bacterial cellulose was produced by *A. xylinum* BPR 2001 (ATCC #700178) at temperature of 28° C., followed by treatment with 1% (w/w) NaOH solution. The bacterial cellulose fibers were washed with de-ionized water until neutral pH. Although bacterial cellulose has a similar chemical structure as plant cellulose derived from other sources, its nanometer diameter leads to the biosynthesized bacterial cellulose as a distinguishable addition to nanocomposite hydrogel. Biosynthesized bacterial cellulose typically has an average diameter of about 50 nm, most often within 10-200 nm, and a high degree of crystallinity.

The loading of bacterial cellulose is preferably sufficiently high to provide a significant improvement in mechanical properties, but also sufficiently low that the nanocomposite material provides sufficient transparency. In one embodiment, the loading is 0.005-4.5% by weight, more preferably within 0.02-0.1%. This later preferred concentration range is limited due to the effect of bacterial cellulose on the transparency of the nanocomposite material in PHEMA nanocomposite materials, as disclosed below. Those skilled in the art will appreciate that nanocomposites formed from other monomers may exhibit different preferred loading concentration ranges.

It is to be understood that the monomer forming the polymer structure may be any transparent polymer forming monomer. Monomers that have (meth)acryloyl groups, styryl groups, allyl groups, vinyl groups and other polymerizable carbon-carbon unsaturated bonds are all suitable. In a preferred embodiment, the monomer is hydroxyethyl methacrylate (HEMA). It is to be understood that polymer nanocomposites according to embodiments described herein can also obtained by employing more than one monomer as long as the monomers can be polymerized or copolymerized to form a transparent material.

The properties of PHEMA can be modified, for example, by the incorporation of a crosslinking species. Alternatively, its hydrophilicity can be increased by the introduction of a second hydroxyl using various monomers. Furthermore, its strength may be increased by the addition of a comonomer. The resulting copolymers, which yield increased hydrophilicity and strength, are exhibited in soft hydrogel films that are flexible even in the dry state. As noted above, polymer nanocomposites of bacterial cellulose and PHEMA are preferably synthesized by free radical polymerization of HEMA in the presence of bacterial cellulose.

Suitable co-monomers may optionally include either hydrophilic monomers or hydrophobic monomers or both. Suitable hydrophilic monomers include, but are not limited to, acrylate monomers of 2-hydroxyethylacrylate, polyethyleneglycol acrylates, polyethyleneglycol methacrylates, 4-hydroxybutylmethacrylate, glycerol mono methacrylate, glycerol mono acrylate, 2-sulfoethylmethacrylate, phenoxyethyl acrylate, phenoxyethyl methacrylate, 2-(2-ethoxyethoxy) ethyl acrylate, 2-(2-ethoxyethoxy)ethyl methacrylate, furfuryl acrylate, furfuryl methacrylate, acrylamide monomers of N-ornithine acrylamide, N-(2-hydroxypropyl)acrylamide, N-phenylacrylamide, dimethylaminopropyl methacrylamide, benzylmethacrylamide, methylthioethylacrylamide, N-vinyl pyrolidone, acrylic acid and the like.

Suitable hydrophobic co-monomers include, but are not limited to, acrylate monomers of lauryl methacrylate, lauryl acrylate, 2-ethylhexyl acrylate, 2-ethylhexyl methacrylate, n-decyl acrylate, n-decyl methacrylate, hexyl acrylate, hexyl metcarylate, stearyl acrylate, stearyl methacrylate, isodecyl acrylate, isodecyl methacrylate, isobornyl acrylate, isobornyl methacrylate, 1-hexadecyl acrylate, 1-hexadecyl methacrylate, n-myristyl acrylate, n-myristyl methacryalte, n-butyl methacrylate, isooctyl acrylate, isotridecyl acrylate, isooctyl methacrylate, and isotridecyl methacrylate, vinyl monomers of vinyl laurate, vinyl stearate, n-dodecyl methacrylamide, butyl acrylate, and the like.

When thermal polymerization is performed, a substance having suitable decomposition characteristics at the desired reaction temperature is preferably used. In general, peroxide initiators and azo initiators having a half-life of 10 hours at temperatures from 40° C. to 120° C. are suitable. Peroxides, azo compounds, carbonyl compounds, sulfur compounds, halogen compounds and metal salts can be used as polymerization initiators. These polymerization initiators can be used individually or in mixtures and are used in quantities up to approximately 5 weight %. For example, about 10 g of HEMA monomer and 0.1 g of benzoyl-peroxide (BPO) were mixed together in examples provided herein. The ratio of initiator to monomers can be applied within 0.2-5% by weight, preferred within 0.5-1.5%. The initiation for the bulk polymerization may be replaced with thermal heating device such as plasma, microwave, infrared, or using UV radiation.

As discussed above, a preferred embodiment employs ultrasound to enhance mixing of bacterial cellulose and the monomer, initiator, and crosslinker before the polymerization. The mixing step provides a uniform dissolution of bacterial cellulose in the liquid phase. Ultrasound enhanced mixing process may complement with mechanical stirring. Preferably, while mixing, the reactant mixture is placed into a vessel and purged with an inert gas (such as nitrogen) to remove the air. Through the ultrasound pretreatment, the reactants mixture is preferably maintained at a temperature below the polymerization temperature (e.g. using a water bath). An increased temperature may assist the mixing process.

As a demonstration of employing ultrasound for assisting the mixing procedure, a VWR Model 50D ultrasound probe at a power level 8 was applied as pretreatment before the polymerization step. Although the ultrasound device was applied to enhance the mixing process, it can also be applied to enhance the polymerization reaction.

The preferred crosslinker for use with the preferred monomer of HEMA, is ethylene glycol dimethacrylate (EGDMA). The amount of crosslinker is essential to change the mechanical property of the hydrogel and the water content of the hydrogel depends on the type of the crosslinker. Generally an increase in the ratio of crosslinkers to monomers will cause the formed hydrogel to be harder and more rigid to reduce the swelling water ability. The preferred ratio of the crosslinker (EGDMA) to monomer HEMA is within a range of 0.1-10%, mostly preferably at 0.5-1.5%.

In a preferred embodiment, a bacterial cellulose nanocomposite hydrogel is formed via bulk polymerization of a HEMA monomer, initiator, and EGDMA cross linker in the presence of bacterial cellulose. Bulk polymerization is carried out at temperatures between 40-70° C., preferably at 55-65° C., with the exclusion of oxygen, for up to 12 hours.

Although preceding embodiments have been described in the context of bulk polymerization, those skilled in the art will be appreciated that the polymerization may be carried out in solvents. In these cases, the formed polymer composites may be soluble in the solvents, or the solvent used may swell into the formed polymer composites. They can be further processed into films by solution casting, or fibers by electronic spinning.

Siloxane containing macromer or prepolymer can also be used as a copolymer. Moreover, the aforementioned embodiments described in the context of BC-PHEMA polymerization, can also be applied to silicon containing prepolymer to form hydrogels of improved water content. Such hydrogels with increase water content can be beneficial for applications involving medical devices such as contact lenses.

Without departing from the scope of the embodiments described herein, the method and nanofiber composite can be further modified for specific medical device applications by incorporating additional chemical groups. For example, besides the hydroxyl groups, chemical functionalities such as arylene groups, alkyl esters, amide groups, carbamate groups, perfluoroalkoxy groups, isocyanate groups, combinations thereof may be introduced.

The polymeric nanocomposite hydrogel, as described in the various aforementioned embodiments, is advantageously used as a material for forming contact lenses with the ability to modulate the mechanical strength and suitable water content. In particular, by controlling the amount of bacterial cellulose and crosslinker incorporated into the hydrogel, the mechanical strength can be modulated to be either weak or strong, depending on the needs of a particular product, and a desirable degree of water retention can be selected. The ability to separately control mechanical strength and water content thus enables the tailoring of the physical properties of the hydrogel to meet the specifications of different applications. In another embodiment, the bacterial cellulose may be functionalized for the linking of silicone, which provides yet another formulation parameter for controlling the water content.

Contact lenses may be formed by directly casting the nanocomposite transparent hydrogel in a mold where the shape of the mold is formed in the shape of a contact lens, or alternatively the inventive nanocomposite hydrogel may be applied as coating on a contact lens. Therefore the liquid state of reactants is convenient for casting a contact lens in a mold for uniform lens fabrication. Such fabrication processes are well known to those skilled in the art.

In another embodiment, the nanocomposite hydrogel may be provided as a composition of a biosensor, for example, in microfluidic biosensors requiring a solid phase surface with excellent porosity and/or non-specific binding.

In yet another embodiment, the nanocomposite hydrogel may be provided as a medium for controlled drug release, which may be fabricated into a biomedical device (for example, a coating on a biomedical device impregnated with a drug). In particular, a bioactive agent may be incorporated into the nanocomposite hydrogel. Bioactive agents include, but are not limited to, drugs and therapeutic molecules (which could be synthesized or naturally derived) such as proteins, peptides, nucleic acids including RNA and DNA, polysaccharides and antibodies and fragments thereof, and combinations thereof.

The polymeric nanocomposite hydrogel can be useful in other biomedical applications including wound healing, and as coatings on implantable medical devices. For example, in one preferred embodiment, the nanocomposite hydrogel is formed as a wound dressing, which enables the visualization and monitoring of the wound as it heals.

The following examples are presented to enable those skilled in the art to understand and to practice the present invention. They should not be considered as a limitation on the scope of the invention, but merely as being illustrative and representative thereof.

EXAMPLE

Synthesis of Bacterial Cellulose Transparent Nanocomposite Hydrogel

Figure 6:
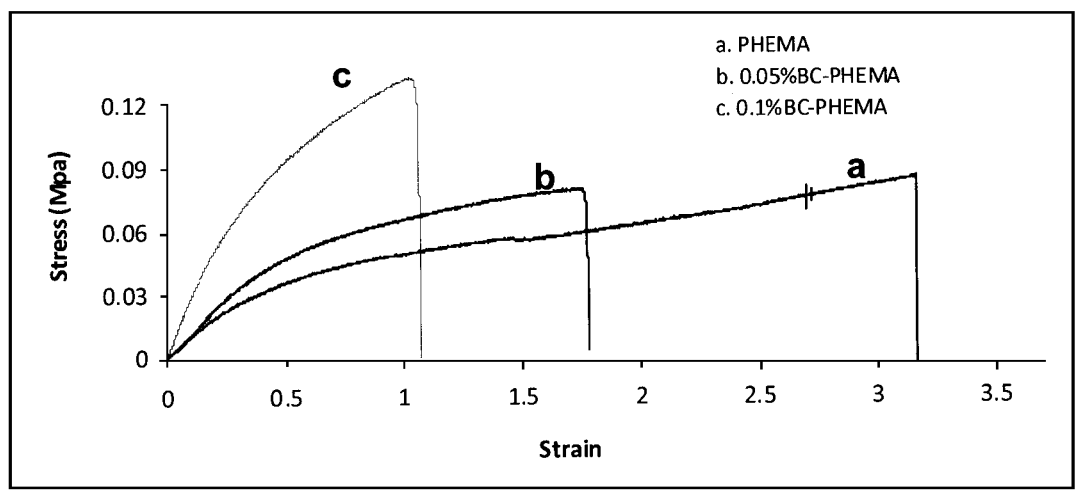
FIG. 6 illustrates mechanical property improvement of BC-PHEMA samples after immersion in water for 10 days.

Preparation of polymer was carried out by free radical polymerization of HEMA directly onto a glass dish with a diameter of 9 mm. 10.0 g HEMA monomer, and 0.10 g BPO introduced into a glass vial, purged with nitrogen for 10 min. Closing the cap on the vial, and put the vial into a water bath, the liquid was pretreated with ultrasound for 2 hours and allow the final temperature reached at 40° C. The liquid was poured onto the glass dish, heated at 60° C. for 12 hours in the atmosphere of flow nitrogen. The obtained sample is transparent clear solid, as evidenced by the photo and UV measurement depicted in FIGS. 1 and 2. This dried sample was immersed in water for up to 10 days, allowing complete water swelling. Three pieces of water swelled sample sheet were used for calculating the water amount in the sample. Five film sheets were cut from the hydrogel sample for mechanical testing as shown in FIG. 6.

Preparation of polymer nanocomposite was carried out by free radical polymerization of HEMA, in the presence of bacterial cellulose, directly onto a glass dish with a diameter of 9 mm. Polymer nanocomposites having compositions as given in Table 1 were made in a like manner to the polymer prepared in Example 1, except with addition of bacterial cellulose. The obtained samples are transparent clear solid, as evidenced by the photos and UV measurement depicted in FIGS. 1 and 2.

TABLE 1

Polymer nanocomposite compositions

| Example No. | HEMA (g) | EGDMA (g) | BPO (g) | BC (g) |
|---|---|---|---|---|
| 1 | 10.0 | 0 | 0.10 | 0 |
| 2 | 10.0 | 0 | 0.10 | 0.05 |
| 3 | 10.0 | 0 | 0.10 | 0.1 |

Figure 3:
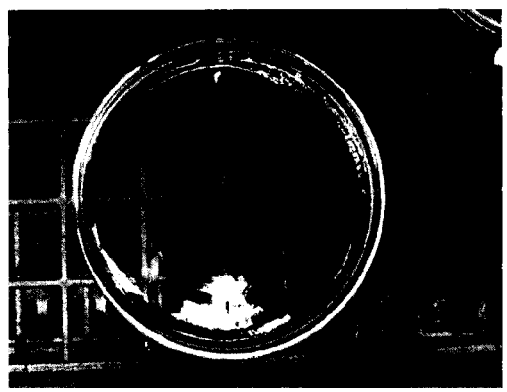
FIG. 3 provides photographs of samples of polymer nanocomposite hydrogels after immersion of dry crosslinked BC-PHEMA samples in water for 10 days, where (a) shows a crosslinked PHEMA hydrogel, and (b), (c), (d) and (e) show crosslinked BC-PHEMA hydrogels with 0.025%, 0.05%, 0.1%, and 0.3% BC, respectively.
Figure 3:
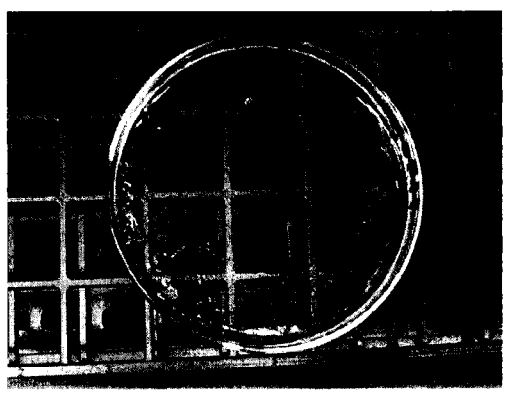
Figure 3:
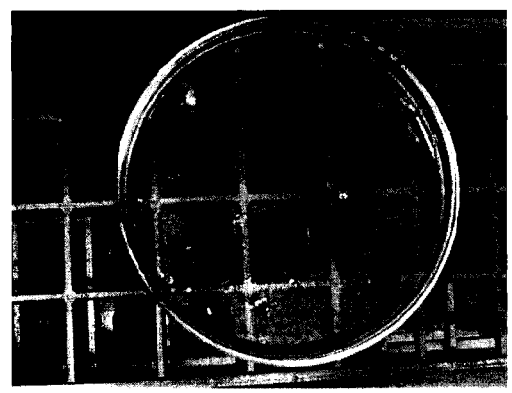
Figure 3:
Figure 3:
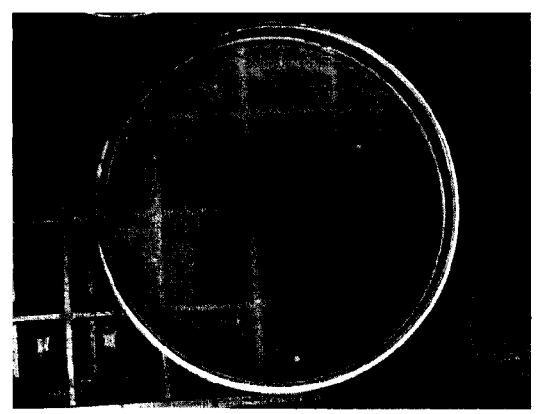
Figure 4:
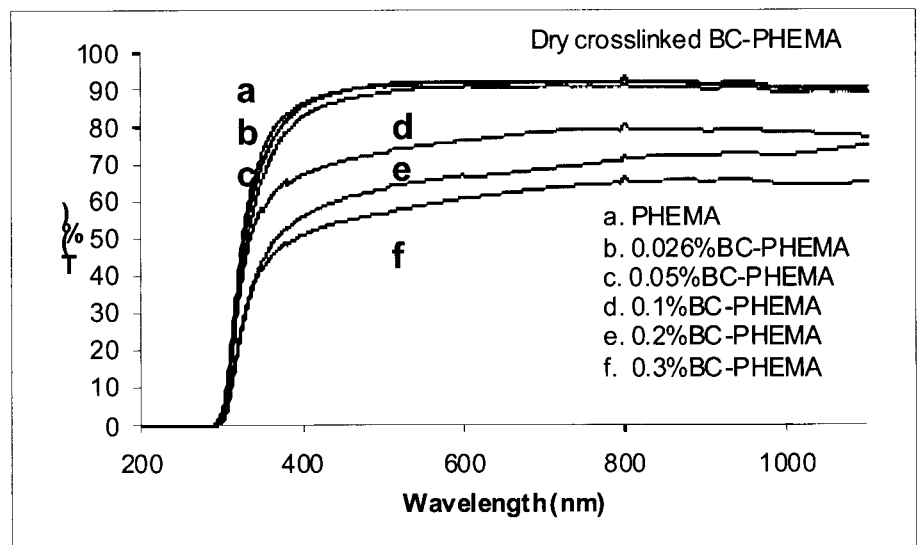
FIG. 4 illustrates optical transmittance of dry crosslinked BC-PHEMA samples.

Preparation of polymer was carried out by free radical polymerization of HEMA directly onto a glass dish with a diameter of 9 mm, wherein a cross linker EGDMA was added. 10.0 g HEMA monomer, 0.10 g BPO and the cross linker EGDMA 0.025 g were introduced into a glass vial, purged with nitrogen for 10 min. The cap was closed on the vial, and the vial was put into a water bath. The liquid was pretreated with ultrasound for 2 hours and the final temperature was allowed to reach at 40° C. The liquid was poured onto the glass dish, heated at 60° C. for 12 hours in an atmosphere of flow nitrogen. The obtained sample is a transparent clear solid, as evidenced by the photos and UV measurements provided in FIGS. 3-5.

This dry sample was immersed in water for up to 10 days, to allow complete water swelling. Three pieces of hydrogel sheet were used for calculating the water amount in the sample. Five film sheets were cut from the hydrogel for mechanical test (see FIG. 7).

Polymer nanocomposites having compositions as given in Table 2 were made in a like manner to the polymer prepared in Example 4, except with addition of bacterial cellulose dispersed in water.

TABLE 2

Crosslinked polymer nanocomposite compositions

| Example No. | HEMA (g) | EGDMA (g) | BPO (g) | BC (g) |
|---|---|---|---|---|
| 4 | 10.0 | 0.05 | 0.10 | 0 |
| 5 | 10.0 | 0.05 | 0.10 | 0.026 |
| 6 | 10.0 | 0.05 | 0.10 | 0.05 |
| 7 | 10.0 | 0.05 | 0.10 | 0.10 |
| 8 | 10.0 | 0.05 | 0.10 | 0.2 |
| 9 | 10.0 | 0.05 | 0.10 | 0.3 |

Figure 8:
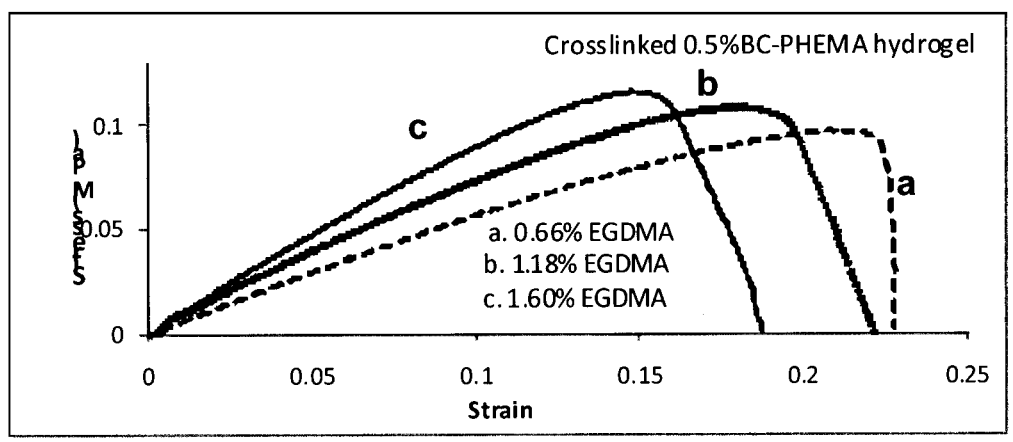
FIG. 8 illustrates the effect of EGDMA content on mechanical properties of crosslinked BC-PHEMA hydrogels.
Figure 11:
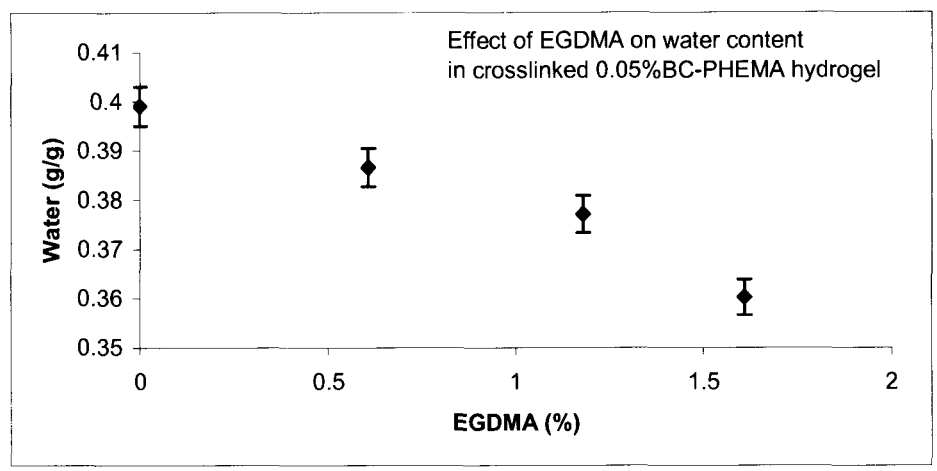
FIG. 11 illustrates the effect of EGDMA concentration on equilibrium water content of crosslinked BC-PHEMA hydrogels.

Polymer nanocomposites having compositions as given in Table 3 were made in a like manner to the polymer prepared in Example 4, except varying the amount of crosslinker. The obtained samples are a transparent solid, as evidenced by the photo and UV measurement. Mechanical strength and water content of these hydrogels are also measured as shown in FIGS. 8 and 11.

TABLE 3

Crosslinked polymer nanocomposite compositions

| Example No. | HEMA (g) | EGDMA (g) | BPO (g) | BC (g) |
|---|---|---|---|---|
| 10 | 10.0 | 0.06 | 0.10 | 0.05 |
| 11 | 10.0 | 0.12 | 0.10 | 0.05 |
| 12 | 10.0 | 0.16 | 0.10 | 0.05 |

Figure 2:
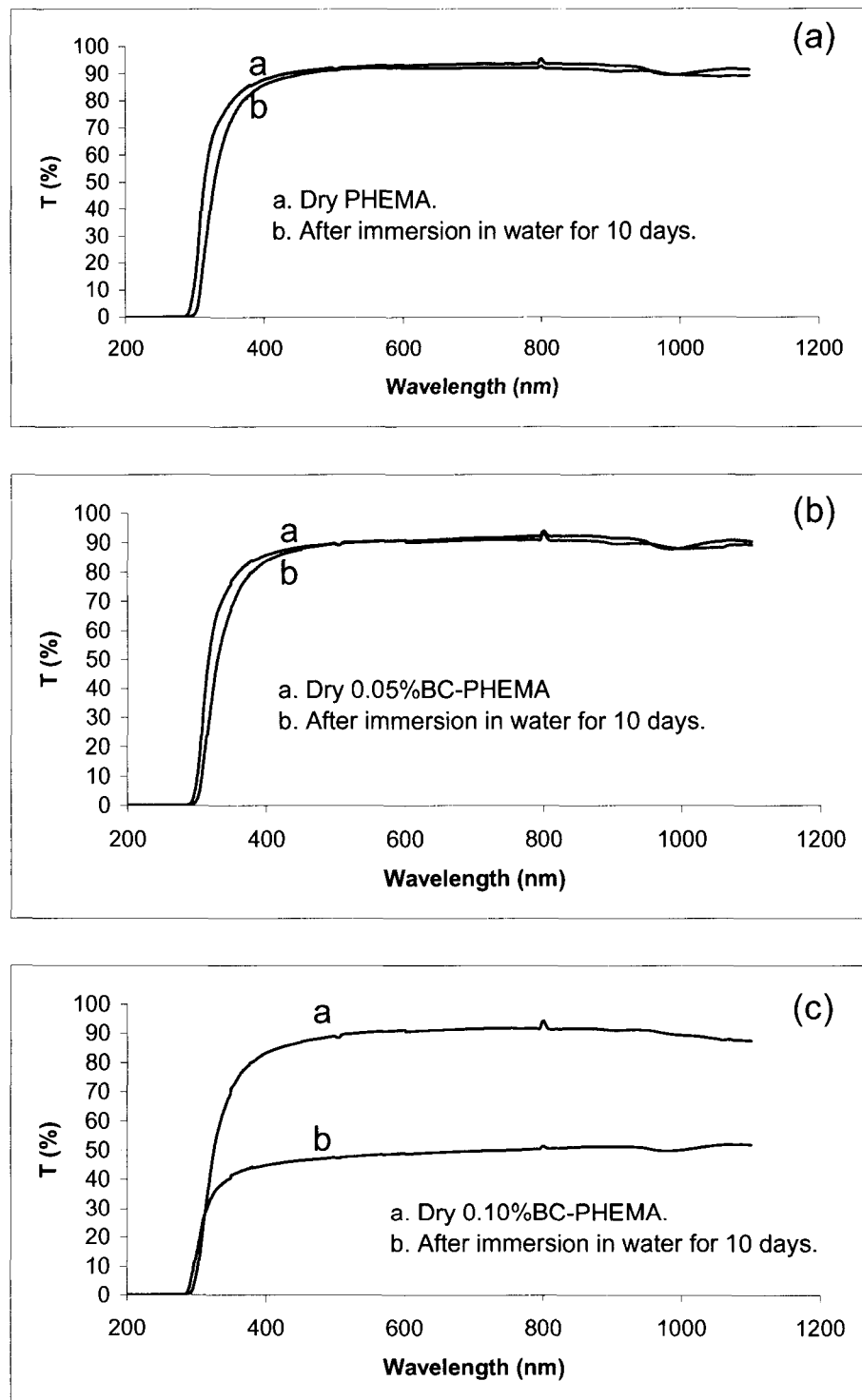
FIG. 2 illustrates optical transmittance of polymer nanocomposite hydrogels after dry BC-PHEMA samples were immersed in water for 10 days, for (a) 0% BC, (b) 0.05% BC, and (c) 0.10% BC.
Figure 5:
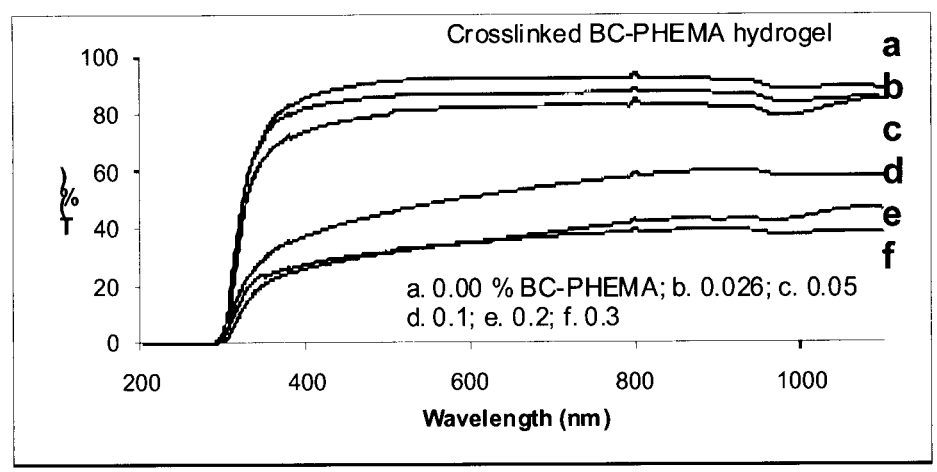
FIG. 5 illustrates optical transmittance of polymer nanocomposite hydrogels after dry crosslinked BC-PHEMA samples were immersed in water for 10 days.
Figure 7:
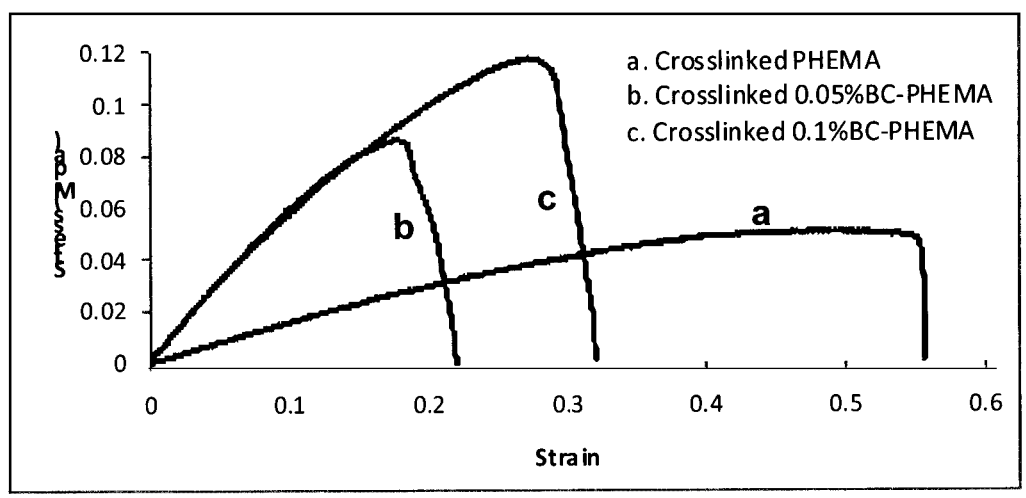
FIG. 7 illustrates the mechanical property improvement due to bacterial cellulose loading in crosslinked BC-PHEMA hydrogels.

Mechanical test by means of strain against stress value is carried out on Instron 8872. Before the mechanical test, sample sheets (25 mm×5 mm×~1.5 mm) were kept in a water bath of constant temperature at 37° C. Referring now to FIGS. 6, 7 and 8, the improvement of mechanical strength of soft polymer nanocomposite hydrogels is illustrated by the introduction of bacterial cellulose in PHEMA and crosslinked PHEMA. In this embodiment, increasing the bacterial cellulose loading intends increase the strength of the formed polymer nanocomposite hydrogels. Another advantage of this embodiment is that provides a nanocomposite hydrogel of good transparency as shown in FIGS. 2 and 5.

Figure 9:
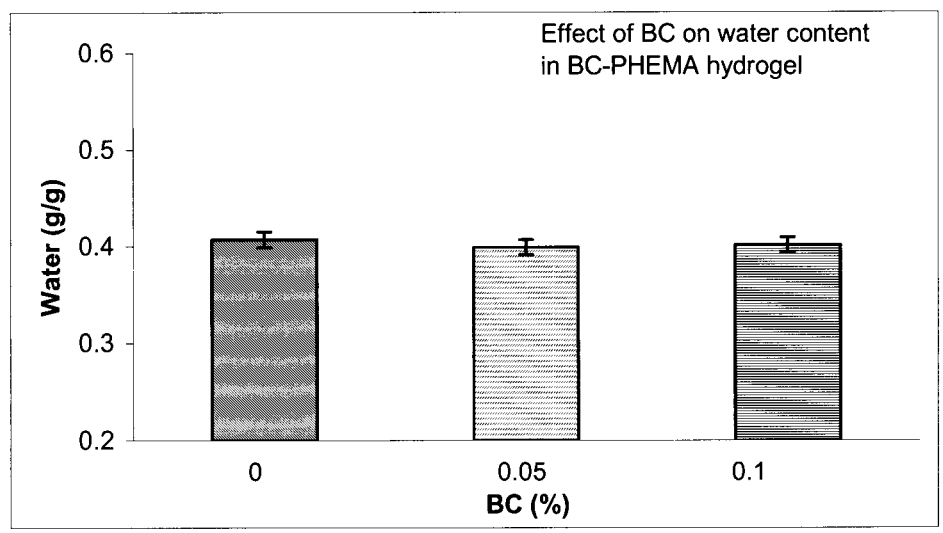
FIG. 9 illustrates equilibrium water content of BC-PHEMA hydrogels.
Figure 10:
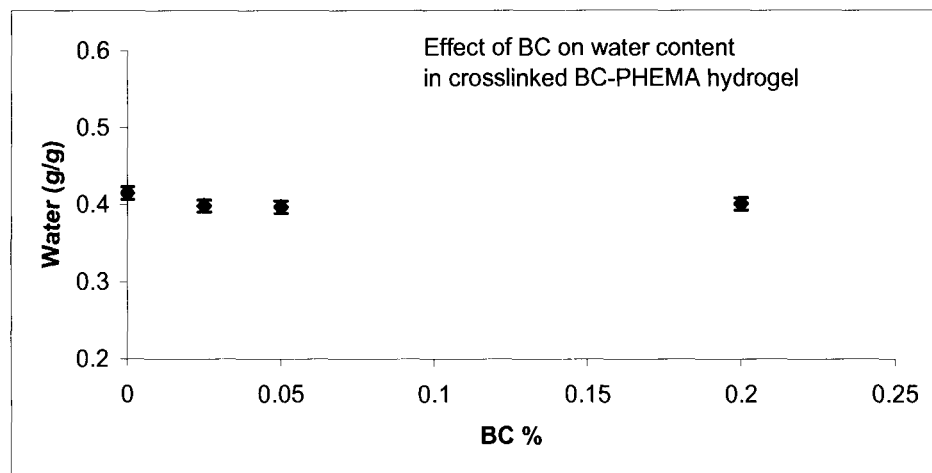
FIG. 10 illustrates the effect of bacterial cellulose loading on equilibrium water content of crosslinked BC-PHEMA hydrogels.

The water content of these nanocomposite hydrogels was measured. Three pieces of water swelled samples are gently pressed and wiped using Kimwipe™, and placed in a vial, then put in oven at 50° C. overnight until the weight reached constant. Referring to FIGS. 9 and 10, for these nanocomposite hydrogels, introducing bacterial cellulose into PHEMA retains the similar level of swollen water content as the PHEMA. In contrast an increase in the ratio of crosslinker to HEMA slightly decreases water content of the nanocomposite hydrogel (FIG. 11).

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES
U.S. Patent Documents

| | | |
|---|---|---|
| 7,279,507 | October 2007 | Hu, et al. |
| 7,247,270 | July 2007 | Hu, et al. |
| 7,249,849 | July 2007 | Marmo, et al. |
| 7,201,481 | April 2007 | Rosenzweig, et al. |
| 7,084,188 | August 2006 | Lai, et al. |
| 7,147,325 | December 2006 | Gotou, et al. |
| 7,091,049 | August 2006 | Boga et al |
| 7,070,640 | July 2006 | Chung et al. |
| 7,074,918 | July 2006 | Medoff et al. |
| 7,074,918 | July 2006 | Medoff et al. |
| 7,074,301 | July 2006 | Hamed et al. |
| 7,104,648 | September 2006 | Dahi et al. |
| 7,097,301 | August 2006 | Legerton et al. |
| 7,098,282 | August 2006 | Novicky |
| 7,071,274 | July 2006 | Fujisawa, et al. |
| 7,045,366 | May 2006 | Huang et al. |
| 6,838,508 | January 2005 | Hsiao et al. |
| 6,500,777 | December 2002 | Wiseman et al. |
| 6,500,777 | December 2002 | Wiseman et al. |
| 6,478,423 | November 2002 | Turner et al. |
| 6,294,614 | September 2001 | Kataoka et al. |
| 6,103,790 | August 2000 | Cavaille et al. |
| 6,103,790 | August 2000 | Cavaille et al. |
| 5,955,326 | September 1999 | Bungay III et al. |
| 5,962,676 | October 1999 | Tammarate |
| 5,629,055 | May 1997 | Revol et al. |
| 5,617,154 | April 1997 | Hoffman |
| 5,498,407 | March 1996 | Atlas |
| 5,484,863 | January 1996 | Molock et al |
| 5,290,830 | March 1994 | Tung et al. |
| 5,207,826 | May 1993 | Westland et al. |
| 5,214,452 | May 1993 | Kossmehl et al. |
| 5,155,194 | October 1992 | Kossmehl et al. |
| 4,451,624 | May 1984 | Howes et al. |
| 4,478,770 | October 1984 | Vofsi et al. |

OTHER REFERENCES

1. Krässig H. et al., Cellulose in Ullmann's Encyclopedia of Industrial Chemistry.
2. Wensheng Cai and Ram B. Gupta, Hydrogels, Kirk-Othmer Encyclopedia of Chemical Technology. 13, 729-759, 2002.
3. Yu-chin Lai, et al., Contact Lenses, Kirk-Othmer Encyclopedia of Chemical Technology. 1-29, 2000.
4. Karlsson J. O., et al., Polymer, 38 (18), 4727 (1997).
5. Princi E., et al., European Polymer Journal, 41, 1196-1203 (2005).
6. Shukla S. R., et al., J. Applied Polymer Science, 42,2163 (1991). 48, 1877 (1993). 51, 1499 (1994).
7. Stickler, M.; Rhein, T., "Polymethacrylates" in Ullmann's Encyclopedia of Industrial Chemistry, 5$^{th}$ ed., Elvers, B.; Hawkins, S.; Schultz, G. Eds., VHS: New York, 1992, A21, 473.
8. Joseph et al., J. Chemical Technology Biotechnology, 78, 964-970 (2003).

Therefore what is claimed is:

1. A transparent nanocomposite hydrogel comprising a hydrophilic polymer network derived from poly(2-hydroxyethyl methacrylate) (PHEMA) and having nanosized cellulose fiber dispersed therein, wherein a concentration of said nanosized cellulose fiber is between 0.005% and 0.1% by weight, and wherein a concentration of PHEMA is approximately 60% by weight.

2. The transparent nanocomposite hydrogel according to claim 1 wherein said nanosized cellulose fiber is bacterial cellulose.

3. The transparent nanocomposite hydrogel according to claim 2 wherein said bacterial cellulose is obtained from *Acetobacter xylinum*.

4. The transparent nanocomposite hydrogel according to claim 2 wherein said bacterial cellulose has an average diameter within a range of about 10 to 200 nm.

5. The transparent nanocomposite hydrogel according to claim 1 wherein said hydrogel comprises poly(hydroxyethyl methacrylate) and further comprises a concentration of ethylene glycol dimethacrylate.

6. The transparent nanocomposite hydrogel according to claim 1 wherein a transparency of said hydrogel within at least a portion of the visible spectrum exceeds approximately 80%.

7. The transparent nanocomposite hydrogel according to claim 1 wherein a transparency of said hydrogel within at least a portion of the visible spectrum exceeds approximately 90%.

8. The transparent nanocomposite hydrogel according to claim 1 further comprising a concentration of a bioactive agent provided therein.

9. The transparent nanocomposite hydrogel according to claim 8 wherein said bioactive agent is selected from the group consisting of drugs, therapeutic molecules, proteins, peptides, nucleic acids including RNA and DNA, polysaccharides, antibodies and fragments thereof, and combinations thereof.

10. The transparent nanocomposite hydrogel according to claim 1, wherein the said nanocomposite hydrogel exhibits an increase in the modulus of elasticity relative to a PHEMA hydrogel that is absent of nanosized cellulose fiber.

11. A transparent nanocomposite hydrogel formed according to the method of claim 1, wherein said transparent hydrogel forming monomer is poly(2-hydroxyethyl methacrylate) (PHEMA), and wherein a concentration of PHEMA is approximately 60% by weight.

* * * * *